No. 770,279. PATENTED SEPT. 20, 1904.
E. GAUCHER.
COMPRESSED AIR OPERATED WATER RAISING OR FORCING APPARATUS.
APPLICATION FILED MAR. 15, 1904.
NO MODEL. 3 SHEETS—SHEET 1.
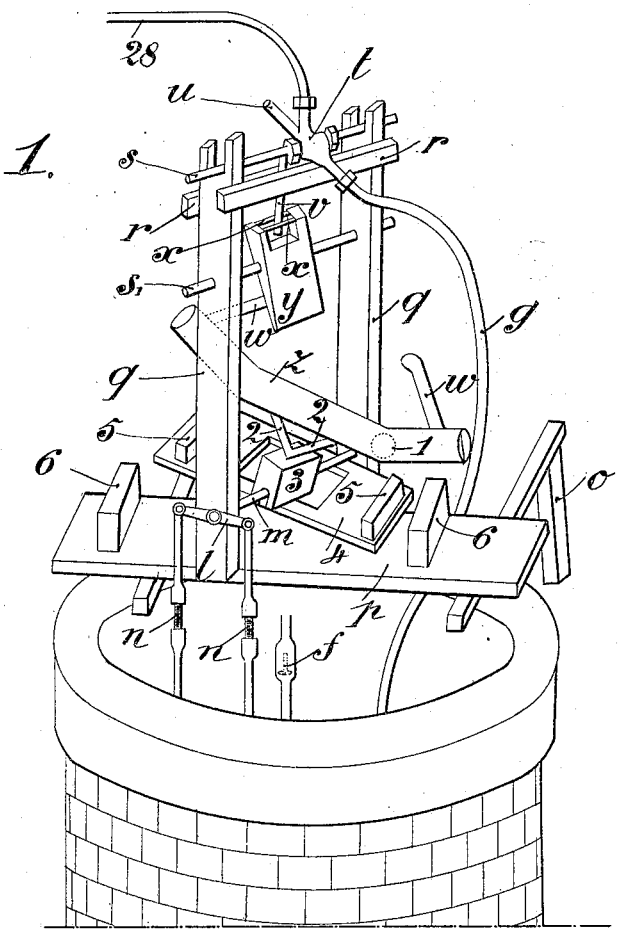
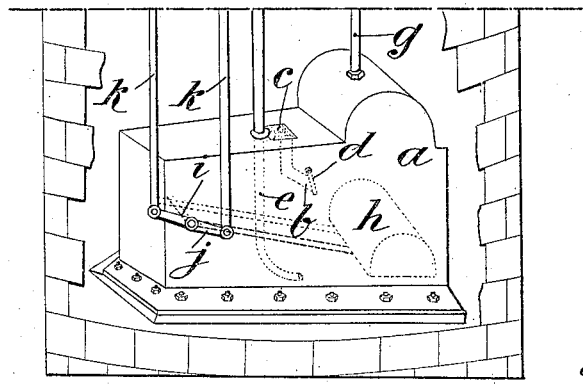

No. 770,279. PATENTED SEPT. 20, 1904.
E. GAUCHER.
COMPRESSED AIR OPERATED WATER RAISING OR FORCING APPARATUS.
APPLICATION FILED MAR. 15, 1904.
NO MODEL. 3 SHEETS—SHEET 2.

No. 770,279.                                         Patented September 20, 1904.

UNITED STATES PATENT OFFICE.

ELIE GAUCHER, OF CONSTANTINOPLE, TURKEY.

COMPRESSED-AIR-OPERATED WATER RAISING OR FORCING APPARATUS.

SPECIFICATION forming part of Letters Patent No. 770,279, dated September 20, 1904.

Application filed March 15, 1904. Serial No. 198,238. (No model.)

*To all whom it may concern:*

Be it known that I, ELIE GAUCHER, a citizen of the Republic of France, and a resident of Constantinople, Turkey, have invented certain new and useful Improvements in or Relating to Compressed-Air-Operated Water Raising or Forcing Apparatus, of which the following is a specification.

This invention relates to apparatus for raising or forcing water by means of compressed air.

The apparatus occupies very little space, is very simple, and at the same time of strong construction, scarcely ever requiring any repairs, though when required they can be effected very easily.

Apparatus according to this invention is illustrated by way of example in the accompanying drawings, in which—

Figure 2:
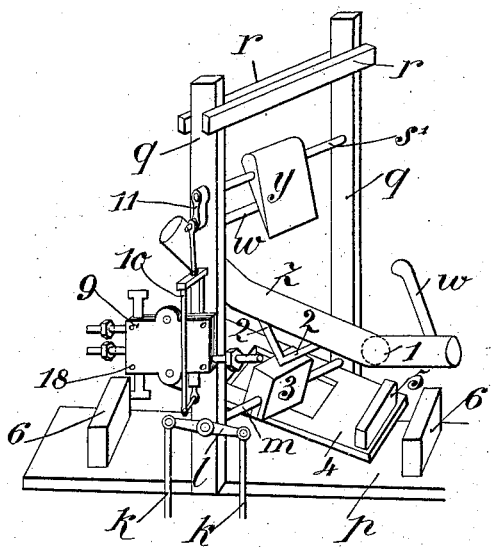
Figure 3:
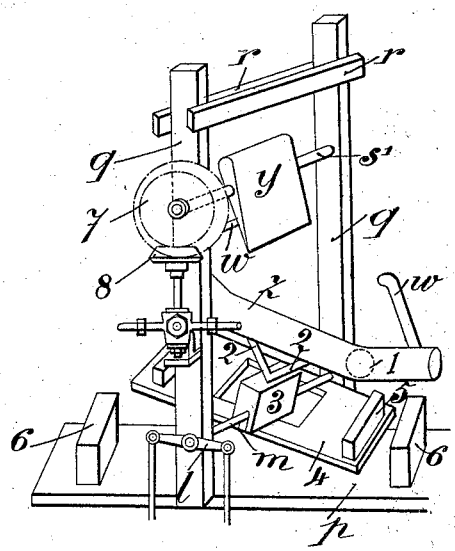
Figure 4:
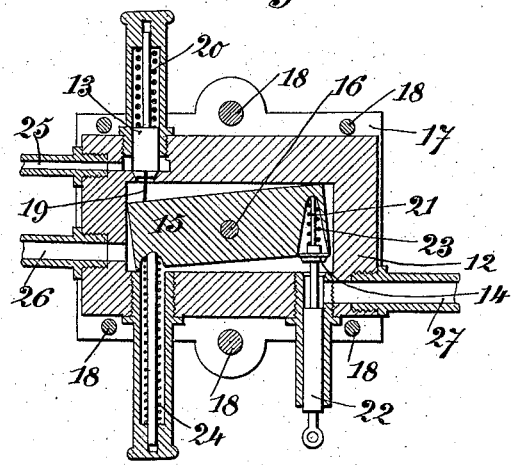
Figure 5:
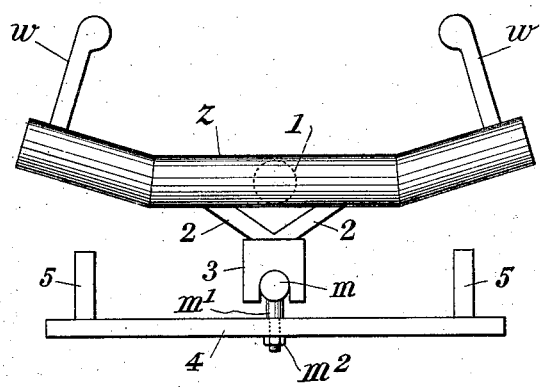
Figure 6:
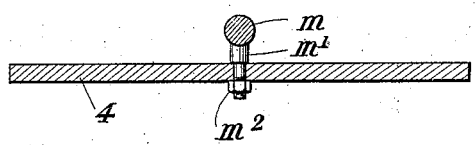

Figure 1 shows the whole apparatus in a perspective view. Figs. 2 and 3 are views showing the application to the apparatus of two different systems of valve-gear for the compressed-air supply. Fig. 4 is a vertical section, on a larger scale, of the valve mechanism shown in Fig. 2. Fig. 5 is a side view, and Fig. 6 a sectional view, representing in detail the manner of mounting the balance lever or hammer on the plate.

The apparatus comprises a receptacle $a$, consisting of two parts, a casing and a base, connected in an air-tight manner by bolts. This receptacle is placed in the water to be pumped, which can enter it through a pipe $b$, provided with a strainer $c$ and a non-return valve $d$. An outlet-pipe $e$, provided with a check-valve $f$, communicates with the said receptacle, and a third pipe $g$ admits compressed air from any suitable source of supply and through a suitable tube, as 28. The receptacle contains a float $h$, secured by arms to a spindle $i$, passing through one or both of the walls in stuffing-boxes, insuring a tight joint. At the outer end of the spindle $i$ is mounted a double-armed lever $j$. To each end of the lever $j$ is pivoted a rod $k$, the upper portion of which is connected to another double-armed lever $l$, secured to a horizontally-mounted spindle $m$. The spindle $m$ is furnished with two projections, as $m'$, which enter openings in plate 4 and are retained by nuts, as at $m^2$, applied on their extremities. The two connecting-rods are provided with adjusting-screws $n\ n$.

The whole of the parts described constitutes the first part of the apparatus. The second part is arranged on a table or any other suitable support, such as $o$. To this support is fixed a board $p$, carrying two uprights $q\ q$. The distance between the uprights is maintained constant by means of two top cross-bars $r\ r$, between which is supported a three-way cock $t$, the plug of which is extended in the form of a spindle $s$, mounted on the uprights $q$. This cock is connected to the pipe $g$ and establishes communication in one of its positions between a pipe $u$, opening into the atmosphere, and the pipe $g$. By means of this cock the compressed-air reservoir is placed in communication with the receptacle $a$ and the receptacle $a$ with the atmosphere.

In order to control or operate the clock $t$, the spindle $s$ has secured to it a small depending rod $v$, which passes between two rods $x\ x$, as shown in Fig. 1, or into a recess in an oscillating lever or part $y$, secured to a spindle $s'$. The oscillation of this lever is caused by the operation of a balance lever or hammer $z$. This hammer is composed of a hollow curved cylinder closed at both ends and provided at both ends with projecting strikers $w\ w$, which, according to the position of the cylinder, strike the right or the left hand side of the lever $y$, and so move it to one side or the other. In the hollow cylinder is arranged a ball $l$, which rolls in the cylinder in accordance with its inclination. This hammer is secured by means of two supporting-rods 2 2 to a block 3, arranged astride the spindle $m$. To the spindle is secured a board 4, on which are provided two projections 5 5. The board 4 turns with the spindle, and in its oscillations one or other of its projections 5 5 raises the hammer $z$. On the stationary board $p$ are two other projections 6 6 of sufficient height in order that when the hammer descends the ball $l$ should come to lie in the angle formed by the central part of the cylinder and one of the inclined end parts.

The three-way cock can be advantageously arranged in vertical position, as shown in Fig.

3. It can be operated in that case by toothed wheels, such as bevel-gears 7 and 8, mounted, respectively, on the spindle $s'$ and on the spindle of the plug of the cock. The cock $t$ could also be replaced by a valve-box 9, Fig. 2, in which the valves are actuated by the oscillations of the lever $y$ through an intermediate connecting-rod 10 of suitable shape, pivoted to a crank 11, mounted on one of the ends of the spindle $s'$. This valve-box is constituted by a central casing 12, Fig. 4, having mounted on it valves 13 and 14 and containing a lever or beam 15, pivoted on a spindle 16, mounted in two lateral plates 17, connected by bolts 18 and surrounding the casing 12, so as to form with it an air-tight box. The bolts 18 also secure the box to the upright $q$. The inlet-valve 13 for compressed air is connected to the beam 15 by a small rod 19 and is, moreover, provided with a spring 20, having the tendency of maintaining it applied against its seat.

The exhaust-valve 14 is provided at one end with a rod 21, freely resting against the bottom of a recess made in the beam 15, and at the other end with a guide-rod 22, pivoted to the connecting-rod 10, Fig. 2. A coiled spring 23, surrounding the rod 21, has the tendency to always maintain the valve 14 against its seat. A spring 24, stronger than the spring 23, exercises at the opposite end of the beam 15 a permanent pressure having the tendency to open the valve 13, and consequently to close the valve 14. A pipe 25 opening into the chamber of the valve 13 admits compressed air, which when the position of the valves is favorable is admitted into the receptacle $a$ through the pipe 26. A pipe 27 opening into the atmosphere enables the air from the receptacle $a$ to escape while it is being filled with water—that is to say, when the beam 13 occupies the position shown in Fig. 4.

The working of the apparatus is as follows: Assuming that the float $h$ has been brought to its highest position by water filling the receptacle $a$, at that moment the cock $t$ will be in communication with the compressed-air reservoir through the pipe 25 and with the receptacle $a$ through the pipe $g$. The valve $d$, opening from the outside inward, is automatically closed by the pressure of the compressed air, and the water being unable to escape through the pipe $b$ will rise in the pipe $e$. The level of water in the receptacle $a$ therefore sinks. The float $h$ descends and turns the spindle $i$, which by means of the connecting-rods $k$ $k$ and the lever $l$ communicates its movement to the spindle $m$. The latter spindle causes the board 4 to oscillate. One of its projections 5 raises the hammer, and the ball 4 under the influence of gravity rolls along the interior of the hammer and brings about the completion of the stroke of the hammer $z$. The latter by means of the striker $w$ causes the lever $y$ to oscillate, and thus produces rotation of the plug of the cock $t$, which assumes the position required for establishing communication between the receptacle $a$ and the atmosphere or for actuating the valve-gear, as already described. The weight of the water outside the receptacle opens the valve $d$ when the counter-pressure of the compressed air ceases. The valve $f$ closes by the weight of water above it, and the receptacle is again filled with water, and the float $h$ rises. Similar movements to those already described then take place, but in the opposite direction. The cock $t$ is returned to its original position, and the same movements take place alternately.

This apparatus can be made very small or as large as may be required.

Having now particularly described and ascertained the nature of my said invention and in what manner the same is to be performed, I declare that what I claim is—

1. A compressed-air-operated water raising or forcing apparatus comprising a closed receptacle having a compressed-air inlet a water-inlet and a water-outlet, a float therein operating a spindle projecting outside the wall of said receptacle a lever device connected thereto and operating a spindle carrying a balance-striking device, a lever operated thereby and a valve operated by said lever to alternately connect the float-receptacle with the compressed-air supply and the atmosphere, substantially as described.

2. In a water raising or forcing apparatus of the kind described a pivoted valve-operating "hammer" composed of a hollow cylinder with upwardly-bent ends and carrying striker-arms at each end and a ball adapted to roll in said cylinder and complete the stroke thereof by its weight, substantially as described.

In testimony whereof I have signed my name to this specification in the presence of two subscribing witnesses.

ELIE GAUCHER.

Witnesses:
A. LANNESSAN,
ALBERT WRIGHT.